United States Patent [19]
Weed

[11] 3,887,272
[45] June 3, 1975

[54] PROCESSING FLUID DISCHARGING APPARATUS FOR MULTIPURPOSE FILM CASSETTES

[75] Inventor: Lucretia J. Weed, Boston, Mass.

[73] Assignee: Polaroid Corporation, Cambridge, Mass.

[22] Filed: Dec. 13, 1973

[21] Appl. No.: 424,555

[52] U.S. Cl............ 352/130; 96/76 R; 117/111 R; 134/64
[51] Int. Cl............................................ G03c 11/00
[58] Field of Search.......... 352/130; 96/76 R, 76 C, 96/29 R; 134/64, 122; 117/111 R, 111 D, 112

[56] References Cited
UNITED STATES PATENTS 3,785,725 1/1974 Batter............................ 352/130 X
3,800,306 3/1974 Land.............................. 352/130 X

*Primary Examiner*—Monroe H. Hayes
*Attorney, Agent, or Firm*—David R. Thornton

[57] ABSTRACT

An improved processing fluid discharging apparatus for photographic film cassettes of the type in which a strip of photographic film is exposed, processed and projected for viewing without removal of the film from the cassette. The improved apparatus prevents the pumping of air to the processing fluid during the processing operation.

4 Claims, 5 Drawing Figures

PROCESSING FLUID DISCHARGING APPARATUS FOR MULTIPURPOSE FILM CASSETTES

BACKGROUND OF THE INVENTION

This invention relates to a multipurpose photographic film cassettes and more particularly, it concerns an improved fluid discharge apparatus for the film processing system of such cassettes.

Multipurpose photographic film cassettes have been developed for use in motion picture photographic systems illustrated and described in such prior references as U.S. Pat. No. 3,615,127 issued to Edwin H. Land on Oct. 26, 1971; U.S. Pat. No. 3,623,417 issued Nov. 30, 1971 to Vito K. Eloranta and U.S. Pat. No. 3,748,994 issued July 31, 1973 to Joseph A. Stella, all of which are owned by the assignee of the present invention. In such systems, a strip of photographic film contained in a cassette can be exposed in a camera adapted to receive the cassette and then processed to provide viewable images by placing the cassette in a viewing apparatus equipped to activate a cassette contained processor upon rewinding the exposed film strip. After processing in this manner, the viewing apparatus is operated as a projector to advance the film incrementally frame by frame past the light source so that the scene to which the film was exposed is reproduced in a manner well-known in the motion picture art.

In such systems, the processing operation after film exposure and before viewing entails the deposition of a uniform coating of processing fluid along the length of the film strip to effect a diffusion transfer of a negative image in a light sensitive emulsion layer on the film strip to a positive image receiving layer or interface. The processing fluid supply is contained in an initially closed pod housed within the film cassette, the pod having a removable closure capable of being opened upon activation of the processor by the viewing apparatus to allow the fluid to escape from the pod and pass through a nozzle-like opening against the exposed emulsion layer on the film strip. The achievement of a uniform and complete layer of processing fluid is vital to satisfactory operation of the system inasmuch as any irregularity or non-uniformity causing less than complete contact of the emulsion layer by the processing fluid will result in undesirable blemishes plainly observable during projection of the processed film.

As disclosed in the aforementioned U.S. Pat. No. 3,748,994, the achievement of an extremely uniform coating of processing fluid is possible in an economically feasible, multi-purpose film cassette by sandwiching the film strip during processing between nozzle and pressure pad surfaces incorporating precision formed U-shaped film engaging lands having leg portions extending along the film margins in the direction of film travel to insure precise parallelism between the film, particularly the light sensitive emulsion layer thereon, and a surface on the nozzle confronting the emulsion. While the processing fluid applicator system disclosed in the aforementioned patent generally has been found to be highly satisfactory, experimentation with the apparatus has shown that under certain conditions small bubbles of air may become entrained in the coating of processing fluid. The air bubbles prevent complete contact of the processing fluid coating with all portions of the emulsion layer and are manifested as uncoated areas in the projected image of the processed film. While the presence of the uncoated areas thus formed in the resulting image may be considered to be minor in the context of overall system operation, the elimination of such blemishes in the viewed image is important to commercial acceptance of the system.

SUMMARY OF THE INVENTION

In accordance with the present invention, the development of air bubbles in the processing fluid layer or coating deposited on the exposed emulsion layer of a film strip in a multipurpose cassette of the type referred to, is avoided by minimizing the air pumping effect caused by film strip travel in close proximity to a stationary nozzle surface in advance of the point at which the processing fluid contacts the emulsion layer on the film strip. The air pumping effect is believed to occur as a result of small amounts of air advancing with the traveling film strip becoming trapped between the strip and an overlying nozzle surface and being pumped or squeezed into the processing fluid issuing from the nozzle opening downstream of the overlying surface in terms of direction of film travel. It is avoided in accordance with the present invention either by spacing the overlying nozzle surface sufficiently from the emulsion layer that air will not become entrapped between the overlying leading surface and the upper surface of the film strip or by inclining the overlying leading surface so that it converges to essentially that of a knife edge.

Accordingly, among the objects of the present invention are: the provision in a multipurpose film cassette of the type referred to, of an improved processing fluid discharge apparatus by which a uniform and complete layer of processing fluid may be deposited on the upper emulsion layer of the film strip during processing; the provision of such an improved processing fluid depositing method and apparatus which avoids the introduction of air particles and resulting development of air bubbles in the processing fluid layer deposited on the emulsion layer of the film strip; and the provision of such an improved processing fluid discharge apparatus which facilitates sealing following the processing operation.

Other objects and further scope of applicability of the present invention will become apparent from the detailed description to follow, taken in conjunction with the accompanying drawings in which like reference numerals designate like parts.

DETAILED DESCRIPTION OF THE PREFERRED EMBODIMENTS

Figure 1:
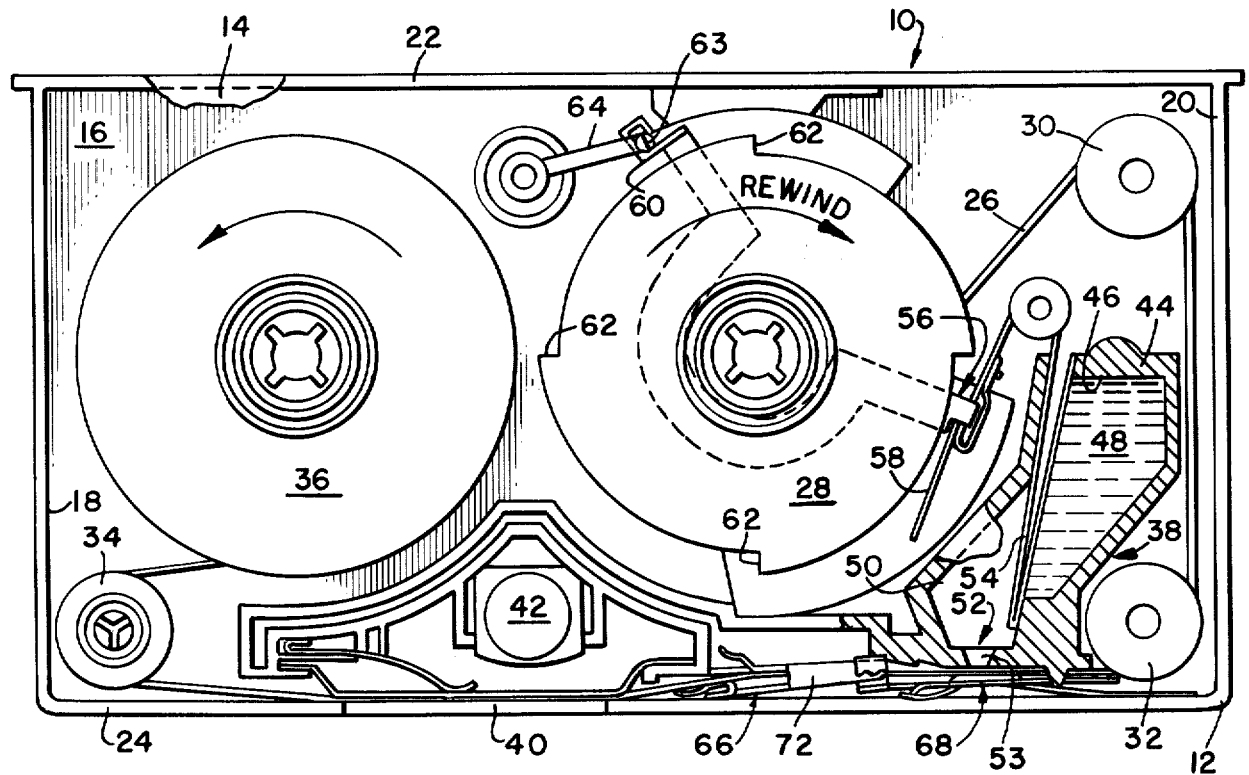
FIG. 1 is a diagramatic side elevation of a motion picture film handling cassette embodying the present invention.

In FIG. 1 of the drawings, a multipurpose film cassette in which the improved processing apparatus of the present invention is particularly suited for use, is generally designated by the reference numeral 10 and shown to include an essentially parallelepiped casing or housing 12 constituted by planar faces or side walls 14 and 16, end walls 18 and 20, and elongated top and bottom edge walls 22 and 24. Carried within the housing 12 is a photographic film strip 26 which is permanently attached at one of its ends to a rotatable supply spool or reel 28 from which it extends within the casing 12 in a somewhat extended path around suitable rollers 30, 32 and 34 to a take-up spool or reel 36 to which the opposite end of the film is attached. In its path within the casing 12, the film 26 extends across a normally inoperative film processor 38, which is subsequently explained in detail, and across an opening 40 which functions at different times to facilitate both exposure and projection. For enabling the latter operation, a reflecting prism 42 is mounted behind the film strip 26 in an adjoining relation to both the opening 40 and to an illumination aperture (not shown) of the side wall 14.

The film processor 38 includes generally a housing 44 having a first compartment or receptacle 46 retaining a source of processing fluid or composition 48 mounted over a second internal chamber 50 which communicates with a coating nozzle generally designated by the reference numeral 52 and having a discharge opening 53. The fluid 48 is initially retained within the sealed tub-like receptacle 46 by a tear-tab 54 which extends from the housing 44 to a tab actuating assembly generally designated by the numeral 56. The actuating assembly 56, which is biased towards the processor 38 by a spring member 58, extends beneath the spool 28 to an end portion 60 which is configured for engagement with teeth 62 formed on the spool. The end portion 60 is retained in an initial position by a post member 63 and is in engagement with a release-cam 64. As explained in the aforementioned prior U.S. patents, upon insertion of the cassette 10 into a projector (not shown) and operation of the cam 64, the tab actuating assembly 56 is released to bring its end portion 60 into engagement with the spool 28. Then, upon rotation of the film spool 28 in the rewind direction, (clockwise as shown by the arrow in FIG. 1) one of the spool teeth 62 operatively engages the end portion 60 to rotate the actuating assembly 56 with the spool to draw the tab 54 from the fluid tub 46 and thereby release the retained fluid 48 to the nozzle 52 and the underlying portions of the film 26.

Figure 2:
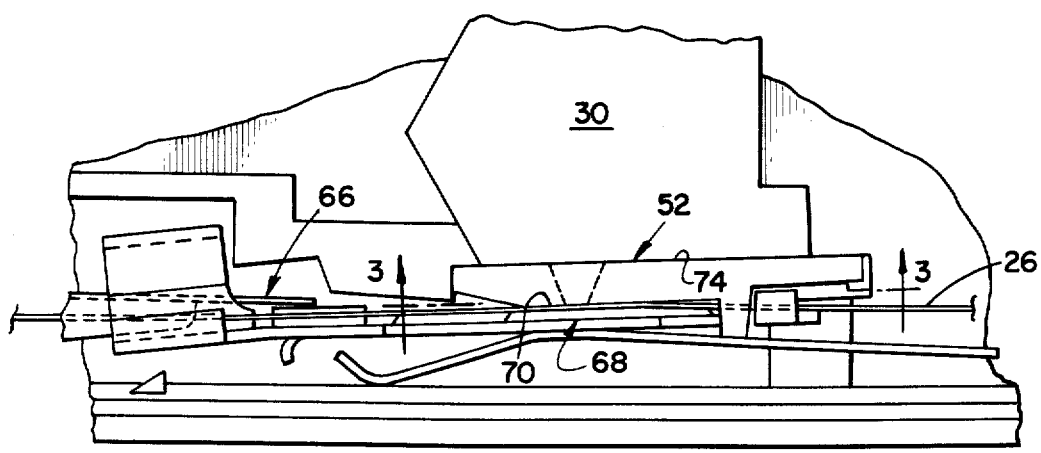
FIG. 2 is an enlarged fragmentary side elevation illustrating the processing fluid discharge apparatus of the invention.

The processor 38 incorporates nozzle valve and pressure pad components which are initially positioned to allow the film strip 26 to pass freely from the roller 32 past the opening 40 to the roller 24 during exposure. The valve and pressure pad components are designated respectively and in general by the reference numerals 66 and 68 in FIGS. 1 and 2 of the drawings. In relation to the nozzle opening 53, the valve 66 is positioned initially to the left as shown in FIGS. 1 and 2 or in front of the nozzle opening in terms of film strip travel during rewind. The pressure pad 68, in this context, is initially located in a position spaced inwardly from and slightly to the right of the nozzle opening 53 or slightly off center behind the opening in terms of film strip travel direction during rewind. In these initial positions, neither the valve nor the pressure pad in any way restricts free travel of the film strip during exposure and projection or in a direction opposite to that of film travel during rewind. The viewing apparatus in which the film strip is processed is programmed such that just prior to release of the tear tab in a manner generally described above, the film strip is advanced through a final increment of travel from the supply spool 28 to the take-up spool 36. During this final increment of travel, a protuberance (not shown) on the film strip engages the pressure pad 68 to advance it from the position illustrated in FIG. 1 of the drawing, to the left so that the precision formed film engaging surface 70 thereon is brought under the nozzle 52 and retain the film firmly against the under surface of the nozzle to be described in more detail below. Following the processing operation and also as a result of a protuberance (not shown) located at the other end of the film strip, the valve 66 is moved to the right from the position illustrated in FIGS. 1 and 2 of the drawings so that it underlies and seals the nozzle opening 53. To deactivate the pressure pad 68, the valve 66 is provided with a pair of side cam surfaces one of which is shown and designated by the reference numeral 72, for camming the pressure pad 66 into an inoperative position spaced from the bottom surface of the nozzle 52 so that after the processing operation and for subsequent projection and rewind cycles, the pressure pad is inoperatively spaced from the nozzle 52 again to allow unimpeded movement of the film strip past the processor.

The organization of the cassette as well as the components contained therein as generally described above, are fully disclosed in the aforementioned prior references. Although the cassette organization in itself is, therefore, not novel with the present invention, the previous description of the cassette organization is believed important to a full understanding of the improved and novel nozzle apparatus of the invention to be described.

From a functional standpoint, the nozzle 52 is an integral part of the processing fluid applicator 38 in that it forms a bottom closure extending across the lower surface of the applicator including the second and terminal chamber 50 into which the processing fluid 48 flows upon removal of the tear tab 54. To facilitate the manufacturing tolerances required in certain surface formations in the nozzle 52, it is formed as a separate piece having a generally planar upper surface 74 (see FIG. 2) secured such as by bonding, fusion welding or the like to the bottom of the applicator 38.

Figure 3:
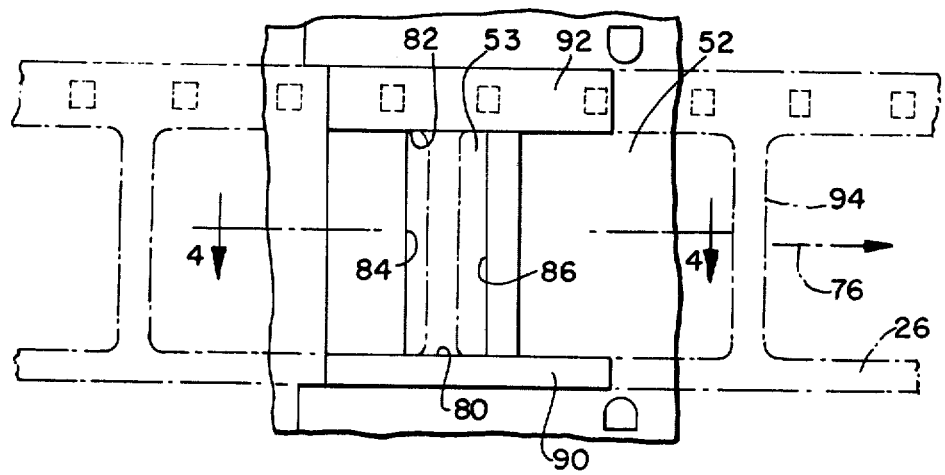
FIG. 3 is an enlarged bottom plan view as seen on line 3—3 of FIG. 2.
Figure 4:
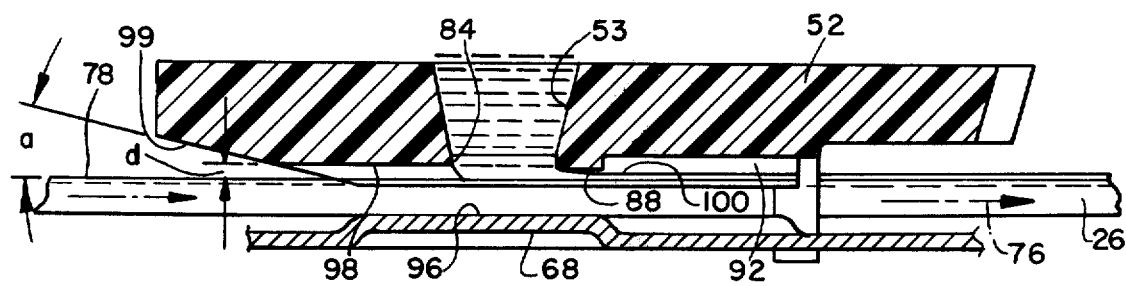
FIG. 4 is an enlarged fragmentary cross-section taken on line 4—4 of FIG. 3 and illustrating one embodiment of the processing nozzle of the present invention.
Figure 5:
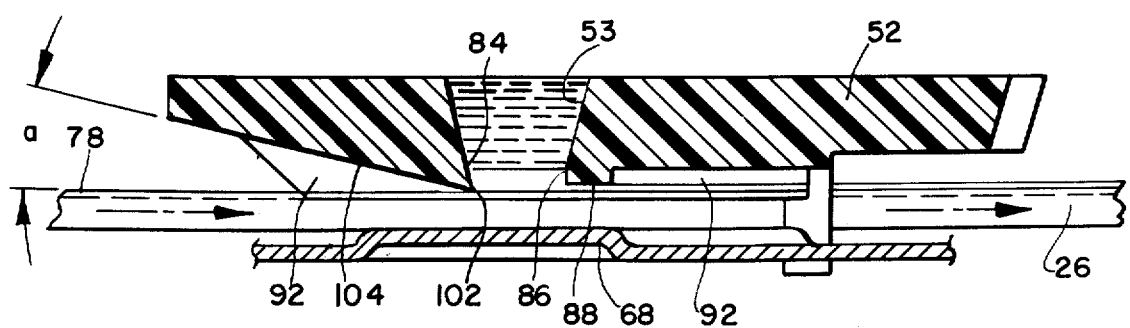
FIG. 5 is an enlarged fragmentary cross-section similar to FIG. 4 but illustrating an alternative embodiment of the apparatus of the present invention.

In FIGS. 3 and 4 of the drawings, the processor nozzle 52 is shown in its operative position during processing relative to the film strip 56, at this time traveling in the direction of the arrows 76 and shown particularly in FIG. 4 to have an emulsion layer 78 presented on its upper surface. As described in the aforementioned U.S. Pat. No. 3,748,994, the nozzle opening 53 extends through the nozzle 52 and is presented at the surface formation confronting the emulsion layer 78 as a rectangular opening having side edges 80 and 82, a leading edge 84 with reference to the direction of film travel during processing and a trailing edge 86 in this context. That portion of the emulsion confronting surface formation on the nozzle 52 immediately following the trailing edge 86 of the nozzle opening 53 effects a processing fluid doctoring surface 88 extending between a pair of longitudinal runners 90 and 92 which make sliding frictional contact with the upper surface of the film strip 26 along the marginal sides of the strip. As can be seen from FIG. 3 of the drawings, the runners 90 and 92 are dimensioned so that the image frames 94 on the film strip are not engaged by the runners. Also it will be noted that as shown in FIGS. 4 and 5, the pressure pad 68 is formed having a precision formed upper land surface 96 functioning during processing to retain the film strip 26 firmly against the runners 90 and 92. Thus, upon passing through the opening 53, the processing fluid is bladed uniformly across the emulsion layer 78 by the doctoring surface 88 extending laterally between the runners 90 and 92.

In accordance with an important feature of the present invention, the leading portion 98 of the surface formation confronting the emulsion layer and extending forwardly of the leading edge 84 of the nozzle opening 53 is slanted or inclined to the film strip as designated at 99 and the full surface 98 is retained by the runners 90 and 92 in spaced relation to the emulsion over at least the major portion of the length of the leading surface. It is believed that because of the angle $a$ and spacing represented by the dimension $d$ in FIG. 4 of the drawing, air particles in contact with the surface of the emulsion and advance with the film strip during processing, will be permitted to circulate in the space between the emulsion and the leading surface 98 forwardly of the leading edge 84 of the nozzle opening 53 in contrast to the prior art where contact between the emulsion layer and the lower portion of the nozzle at this point resulted in a pumping of air into the fluid 48 issuing from the nozzle opening 53. Although the precise spacing $d$ of the surface 98 above the emulsion layer may vary, where the thickness of the processing fluid layer 100 spread uniformly across the emulsion layer by the doctor blade 88 is approximately 0.0005 inches, it is preferred that the spacing $d$ be in excess of 0.005 inches and on the order of 0.010 inches. Though it is expected that increasing the dimension $d$ beyond 0.010 inches will prevent the pumping of air into the processing fluid issuing from the nozzle opening 53, it is important that the fluid be prevented from flowing forwardly of the leading edge 84 of the opening. The combination of surface tension in the processing fluid coupled with the direction of film strip movement during processing prevents such forward flow of fluid where the spacing $d$ is on the order of 0.010 inches.

In FIG. 5 of the drawings, an alternative embodiment of the processing nozzle of the present invention is shown. An indicated by reference numerals common to both this Figure and FIG. 4, previously described, the nozzle structure in this embodiment is identical in all respects with respect to surface formations trailing or located behind the trailing edge 86 of the nozzle opening 53. In this instance, however, the leading surface portion 104 preceding the nozzle opening 53 is inclined over substantially its full length so as to terminate in a knife-like edge 102 as an integral formation on the nozzle surface confronting the emulsion layer 78 on the film strip 26 and forming the leading edge 84 of the opening. It is believed that the converging angle $a$ tends to force the air adjoining the film into a convolute stream within the angle or otherwise to direct this air back out of the angle and thereby prevent pumping of air into the fluid. Further, by virtue of the extremely short length over which any portion of the emulsion confronting surface formation on the nozzle, preceding the deposition of processing fluid, there is reduced possibility of air entrapment between the edge 102 and the emulsion such as might result in a pumping of air particles into the processing fluid and the creation of unwanted air bubbles. Spacing over the surface 104 preceding the knife edge 102 is not in this instance a factor which would effect the leakage of processing fluid forwardly of the nozzle opening due to the knife-like edge 102. The arrangement illustrated in FIG. 5 is advantageous inasmuch as it also facilitates closure of the nozzle opening 53 by the valve member 66 upon completion of the processing cycle to prevent unwanted leakage of residual processing fluid prior to the time such residual processing fluid is evaporated.

Thus it will be seen that by this invention there is provided an improved processing method and apparatus for multipurpose photographic film cassettes of the type described and by which the aforementioned objectives are completely fulfilled. It will also be understood by those skilled in the art that various modifications and/or changes can be made in the described embodiments without departure from the true spirit and scope of the present invention. Accordingly, it is expressly intended that the foregoing description is illustrative of preferred embodiments only, not limiting, and that the true spirit and scope of the present invention will be determined by reference to the appended claims.

What is claimed is:

1. An applicator for treating with processing fluid an exposed strip of photographic film material having a light sensitive emulsion on one surface so as to develop viewable images on such film strip, said applicator comprising a housing including a chamber configured to receive such processing fluid, said housing including a processor nozzle having a surface formation configured to confront the emulsion layer on the film strip and having an opening through said surface formation for depositing a layer of processing fluid on at least a portion of such emulsion intermediate the margins of such film strip when relative motion is effected between such film strip and said housing so as to advance such film strip across said nozzle surface, said opening having leading and trailing edges in relation to the relative motion of such film strip during processing, said surface formation extending forwardly of said leading edge and rearwardly of said trailing edge, and said surface formation forwardly of said leading edge being inclined so such film strip so as to form with said film an angle converging towards said opening and terminating in a knife-like leading edge of said opening.

2. The apparatus recited in claim 1 wherein said surface formation forwardly of said leading edge terminates in a depending knife blade formation establishing an essentially line contact between said nozzle and the surface of the emulsion layer at the leading edge of said opening.

3. In a multipurpose film cassette containing a strip of photographic film having a light sensitive emulsion on one surface and adapted to be exposed and processed without removal from the cassette, the cassette also containing a processor for applying a coating of processing fluid on the emulsion after exposure, the improvement comprising a processor nozzle having a surface formation positioned in the cassette to confront the emulsion layer on the film strip and having an opening through said surface formation for depositing processing fluid on at least a portion of such emulsion layer intermediate the margins of such film strip, said opening having leading and trailing edges in relation to film strip travel during processing, said surface formation extending forwardly of said leading edge and rearwardly of said trailing edge and said surface formation forwardly of said leading edge being inclined to said film strip so as to form therewith an angle converging towards said opening and terminating in a knife-like leading edge of said opening.

4. The cassette recited in claim 3 wherein said surface formation forwardly of said leading edge terminates in a depending knife blade formation establishing an essentially line contact between said nozzle and the surface of the emulsion layer at the leading edge of said opening.

* * * * *